Patented Oct. 1, 1940

2,216,514

UNITED STATES PATENT OFFICE 2,216,514

CORROSION-RESISTING COMPOSITION

David Isenberg, Brooklyn, N. Y., assignor to Surface-Proofing Products, Inc., New York, N. Y., a corporation of New York No Drawing. Application March 21, 1938, Serial No. 197,199

11 Claims. (Cl. 260—31)

This invention relates to corrosion resistant compositions. More particularly, it relates to compositions which are useful for protecting metal against the corrosive action of gasoline, salt water, steam, air, and the corrosive substances, and which may be applied easily to form a durable protective coating.

One of the greatest difficulties involved in conveying gasoline by ocean-going tankers, or in storing large quantities of gasoline for use on the seas, lies in the rapid corrosion of the tanks in which the material is carried. These tanks during the ordinary course of operation are subject to a routine which may probably be considered one of the severest in regard to corrosive influences. The first corrosive influence is the gasoline itself. Corrosion begins as soon as the gasoline is put into the tanks and continues throughout the time the gasoline is contained therein, which period may be from several days to several weeks. Gasoline normally acts as a solvent and dissolves and loosens any composition that may have been applied to the metal in the hope of preventing corrosion. This has been invariably true in the past as no paint-like composition heretofore has been discovered which could not be dissolved or loosened by gasoline.

The next corrosive influence to which these tanks are subject is that of salt water. Salt water normally is used to replace the gasoline after the latter has been discharged from the tanks, in order to reballast the tankers while they return to the port of supply for new consignments. As no protective coatings are present on the linings of the tanks at this stage, the salt water, having well known corrosive effects, is free to act on the metal. Upon arriving at the point of destination it is then necessary to remove the salt water from the tanks and to treat them with steam in order to clean them sufficiently to free them of impurities which would later contaminate gasoline. After the tanks have been properly steamed and cleaned by means of steel brushes, a sludge containing corroded material is removed. The tanks are then allowed to dry and are ready for a new load of gasoline.

Many attempts have been made to protect the linings of these gasoline tanks from the severe corrosive influences to which they are subject in use. Up to this time, however, neither stainless steels, alloys, or paint-like compositions have been found which could withstand the varied corrosive effects of gasoline, salt water and steam and still be suitable for use as protective agents.

One of the objects of this invention is to provide a paint-like composition which resists the varied corrosive effects of gasoline, salt water, steam, air and the like and which will stick to metal surfaces upon which it is applied and protect the metal even when subject to prolonged contact with gasoline or other materials that dissolve or loosen known types of paint-like coatings.

Another object of this invention is to provide a paint-like composition that will protect metals covered therewith from the corrosive action of salt water.

A further object of this invention is to provide a paint-like composition that will protect the inner metallic walls of tanks from corrosion even when such walls are subjected to the corrosive action of gasoline and salt water, alternately.

A further object of this invention is to provide a paint-like composition that will protect the inner metallic walls of tanks from corrosion when such walls are subject to the corrosive action of gasoline, salt water, and steam, alternately.

Still another object of this invention is to provide a paint-like composition suitable for accomplishing such results that can readily be applied by means of a brush or spray gun.

I have found that corrosion resistant compositions possessing the desirable qualities indicated above can be prepared by intimately mixing fowl gall with a varnish, a glycol, an alcohol, and a siccative. Although this mixture alone will attain the above objects, I have further found that it can be improved by adding thereto an acid resistant pigment, insoluble fillers, and a small amount of mercuric salts. Such compositions have excellent corrosion-resistant properties, and they protect metal surfaces which have been covered therewith against corrosion by salt water, gasoline, steam and other corrosive substances. When used as protective coatings for the steel walls of gasoline tanks under the conditions mentioned above they overcome the difficulties which have been encountered heretofore and enable continuous use of the tanks for long periods of time.

In preparing the composition of my invention I first thoroughly mix the liquid ingredients which, in accordance with my preferred formula, consist approximately of: 40 gallons of synthetic varnish, 5 gallons of ethylene glycol monoethyl ether, ½ gallon of pure gall obtained from fowl, 2 gallons of high-test alcohol, and 1 gallon of cobalt driers. I then transfer this liquid to a mixer along with pigments and fillers which, in accordance with my preferred formula, consist approximately of: 100 lbs. of Titanox, 50 lbs. of lithopone, 50 lbs. of plaster of Paris, 50 lbs. of white Portland cement, 15 lbs. of pumice stone powder, 5 lbs. of mercuric chloride, 2 lbs. of mercuric oxide, and 10 lbs. of pure magnesium silicate. Due to the nature of the ingredients an exothermic chemical reaction ensues in the resulting mixture, whereupon the composition is permitted to remain at rest to ferment. After the completion of this reaction, the approximate end point of which may be selected by determining the point when additional agitation of the mixture no longer results in a substantial, visible reaction, the mixture is transferred to a mill and ground. It is then transferred to a container and allowed to ferment for approximately two hours, at the expiration of which time it is ready for use and can be put into cans and sealed. When compounded as described above approximately 66 gallons of the corrosion-resistant paint-like composition are obtained.

When the corrosion resistant substance is compounded in accordance with another of my preferred formulae, the ratio of liquid to solid ingredients in parts by weight is changed from 5:6 to 3:6. This can readily be accomplished by using approximately three-fifths of the amount of liquid mixture prepared in accordance with the above description for the same amount of pigment used above.

Although the formulae and ingredients set forth above represent preferred examples of methods of compounding my corrosion resistant compositions, the proportions of the various ingredients and the constituents themselves may be modified somewhat without departing from my invention. In fact, as the pigments and fillers are only present in my preferred formulae because they improve the quality of the corrosion resistant composition, various substitutes and equivalents could readily replace the preferred ingredients specified. Among the suitable fillers that may replace in whole or in part the pumice stone powder specified in the preferred formula are bentonite, barytes, and Calfix (a calcium carbonate filler). Additional quantities of Titanox (a mixture of titanium oxide and barium sulfate) could be added to replace the lithopone in whole or in part. The lithopone could also be replaced by a mixture consisting of aluminum stearate and zinc oxide. Various types of cement can be used in place of the white Portland cement. It may be replaced by a waterproofing substance. Both mercuric salts are not essential. It has been found, however, that the salts specified and the ratio given in the preferred formulae do give excellent results.

Although the liquid constituents are not as variable as the pigments and fillers, I have found that glycol ethers, such as ethylene glycol monoethyl ether, can be replaced by glycols, such as ethylene glycol. Synthetic varnish such as is produced from phthalic acid or glycerol resins is specified in these preferred formulae, but any varnish which possesses similar qualities when combined with fowl gall and a strong solvent, such as ethylene glycol monoethyl ether, may be used in preparing a corrosion resistant substance of this nature. Although the liquid drier specified in my preferred formulae is a cobalt drier containing 5½% cobalt, any drier possessing similar qualities may be used.

The corrosion resistant compositions obtained in accordance with my invention are admirably adapted for use in protecting the linings of tanks normally used as containers for gasoline. This is true because they can be applied readily by brush or spray gun, preferably the former, and because the metallic surfaces to which they are applied remain protected for a long period against the corrosive actions of gasoline, salt water, and steam. In forming a protective coating on surfaces I have found it desirable to apply two coatings at 24 hour intervals and to refrain from exposing the coating to the corrosive media until the sixth day after the second coating has been applied. The heavy coating produced in this manner has a hard outer film which is impervious to gasoline, salt water, or steam. If the hard outer film cracks for some reason or other, the inner material, which retains its life and softness, promptly hardens, thus presenting a new bulwark against corrosion. Coatings of this type have withstood the intense corrosive influences of gasoline and salt water for periods in excess of ten months without having been noticeably affected.

The utility of the corrosion resistant compositions of my invention is not limited to the specific fields herein disclosed. It is intended that the claims appended hereto shall cover the compositions therein specified without regard to the enumerated fields of use, for other uses in many industries will occur to those skilled in the art. It should also be understood that the present invention is not limited to the specific examples herein disclosed but that it includes all variations and proportions of the materials within the tenor of the whole description and the claims appended hereto.

I claim:

1. A corrosion resistant composition containing the following ingredients in substantially the proportions given: 40 gals. of a synthetic varnish, 5 gals. of ethylene glycol monoethyl ether, ½ gal. of pure gall obtained from fowl, 2 gals. of a high-test alcohol and 1 gal. of a cobalt liquid drier.

2. A corrosion resistant composition suitable for use as a protective coating for metals subject to the action of corrosive materials, such as gasoline, salt water, and the like, comprising essentially, varnish, a glycol ether, a siccative, fillers and a quantity of fowl gall which imparts stability against attack by said corrosive materials.

3. A corrosion resistant composition suitable for use as a protective coating for metals subject to the action of corrosive materials, such as gasoline, salt water, and the like comprising essentially, varnish, a glycol ether, a siccative, acid resistant pigments, insoluble fillers, mercuric salts and a quantity of fowl gall which imparts stability against attack by said corrosive materials.

4. A corrosion resistant composition containing the following ingredients in substantially the proportions given: 150 lbs. of an acid resistant pigment, 50 lbs. of plaster of Paris, 50 lbs. of cement, 15 lbs. of an insoluble filler, 7 lbs. of mercuric salts, and 10 lbs. of pure magnesium silicate incorporated in a liquid mixture consisting of 40 gals. of a synthetic varnish, 5 gals. of a glycol ether, ½ gal. of gall obtained from fowl, 2 gals. of alcohol, and 1 gal. of a siccative.

5. A corrosion resistant composition containing the following ingredients in substantially the proportions given: 150 lbs. of an acid resistant pigment, 50 lbs. of plaster of Paris, 50 lbs. of cement, 15 lbs. of an insoluble filler, 7 lbs. of mercuric salts, and 10 lbs. of pure magnesium silicate incorporated in a liquid mixture consisting of 24 gals. of a synthetic gum base varnish, 3 gals. of a glycol ether, .3 gal. of gall obtained from fowl, 1.2 gals. of alcohol, and .6 gal. of siccatives.

6. A corrosion resistant composition containing the following ingredients in substantially the proportions given: 100 lbs. of Titanox, 50 lbs. of lithopone, 50 lbs. of plaster of Paris, 15 lbs. of insoluble fillers, 7 lbs. of mercuric salts, and 10 lbs. of pure magnesium silicate incorporated in a liquid mixture consisting of 40 gals. of synthetic gum base varnish, 5 gals. of a glycol ether, ½ gal. of gall obtained from fowl, 2 gals. of alcohol, and 1 gal. of a cobalt drier.

7. A corrosion resistant composition containing the following ingredients in substantially the proportions given: 100 lbs. of Titanox, 50 lbs. of a mixture of aluminum stearate and zinc oxide, 50 lbs. of plaster of Paris, 15 lbs. of insoluble fillers, 7 lbs. of mercuric salts, and 10 lbs. of pure magnesium silicate incorporated in a liquid mixture consisting of 24 gals. of a synthetic gum base varnish, 3 gals. of ethylene glycol mono-ethyl ether, .3 gal. of gall obtained from fowl, 1.2 gals. of alcohol, and .6 gal. of a cobalt liquid drier.

8. A corrosion resistant composition containing the following ingredients in substantially the proportions given: 100 lbs. of Titanox, 50 lbs. of lithopone, 50 lbs. of plaster of Paris, 15 lbs. of pumice stone powder, 5 lbs. of mercuric chloride, 2 lbs. of mercuric oxide and 10 lbs. of pure magnesium silicate incorporated in a liquid mixture consisting of 40 gals. of a phthalic acid resin base varnish, 5 gals. of ethylene glycol mono-ethyl ether, ½ gal. of gall obtained from fowl, 2 gals. of a high-test alcohol, and 1 gal. of a cobalt drier.

9. The method of preparing a corrosion resistant composition suitable for the protection of metals subject to the corrosive action of gasoline, salt water, and the like corrosive materials comprising intimately mixing with varnish, a glycol ether, a high-test alcohol, and a siccative, a quantity of gall obtained from fowl which imparts stability against corrosive attacks, adding acid resistant pigments, insoluble fillers, water-proofing materials and mercuric salts, agitating the liquid solid mixture so obtained, permitting the mixture so agitated to ferment, grinding the fermented mixture and allowing the ground material to ferment for approximately two hours before using the same.

10. The method of preparing a corrosion resistant composition suitable for the protection of metals against corrosion comprising intimately mixing with a synthetic varnish, a glycol ether, a high-test alcohol and a siccative, a quantity of gall which imparts stability against attack by corrosive materials, adding acid resistant pigments, plaster of Paris, cement, insoluble fillers and mercuric salts to the liquid mixture, agitating the mixture so obtained, permitting the same to ferment, grinding the fermented mixture and allowing the ground material to ferment for approximately two hours before using the same.

11. In a corrosion resistant paint composition containing varnish, a glycol ether and a siccative, a quantity of fowl gall which imparts stability against attack by gasoline.

DAVID ISENBERG.